United States Patent

[11] 3,614,495

| [72] | Inventors | Yasuo Suzuki;<br>Yasuyoshi Kameyama, both of Osaka, Japan |
|---|---|---|
| [21] | Appl. No. | 882,018 |
| [22] | Filed | Dec. 4, 1969 |
| [45] | Patented | Oct. 19, 1971 |
| [73] | Assignee | Matsushita Denko Kabrishiki Kaisha<br>Osaka, Japan |
| [32] | Priority | Dec. 9, 1968 |
| [33] | | Japan |
| [31] | | 43/9065 |

[54] SYNCHRONOUS MOTOR
6 Claims, 8 Drawing Figs.

[52] U.S. Cl. .................................................. 310/162, 310/174, 310/268
[51] Int. Cl. .................................................. H02k 19/00
[50] Field of Search .................................................. 310/162, 163, 268, 164, 169, 172, 174, 170, 254

[56] References Cited
UNITED STATES PATENTS

| 2,412,461 | 12/1946 | MacIntyre | 310/164 |
| 3,058,019 | 10/1962 | Eisler | 310/164 |
| 3,330,975 | 7/1967 | Osterwalder | 310/164 |
| 3,432,706 | 3/1969 | Beyersdorf | 310/268 |
| 3,466,479 | 9/1969 | Jarret | 310/268 |

Primary Examiner—D. F. Duggan
Assistant Examiner—R. Skudy
Attorney—Wolfe, Hubbard, Leydig, Voit & Osann, Ltd.

ABSTRACT: A fixed-directional self-starting synchronous motor comprising a stator associated to an exciting coil therefor and having two groups of radially extending pole teeth of the same number, and a rotor magnetized to have the same number of North and South poles in total with total number of the stator pole teeth and disposed rotatably above the stator. Respective pole tooth groups of the stator are of different width from each other and arranged alternately one by one. The two pole tooth groups are further deviated by a desired angle in a desired rotating direction of the rotor from the position of the case in which the groups are arranged at a regular interval, respectively.

PATENTED OCT 19 1971
3,614,495
SHEET 1 OF 2
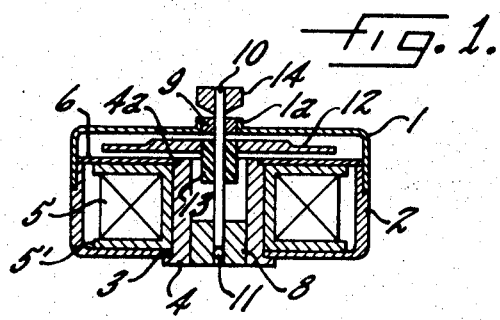
fig.1.
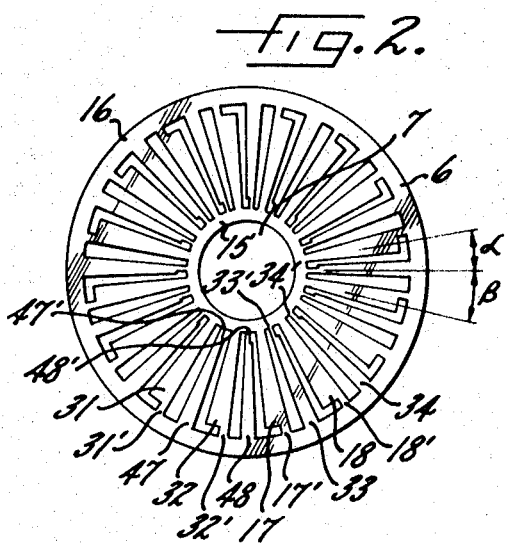
fig.2.
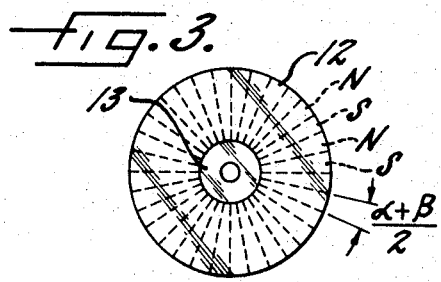
fig.3.
fig.4A.
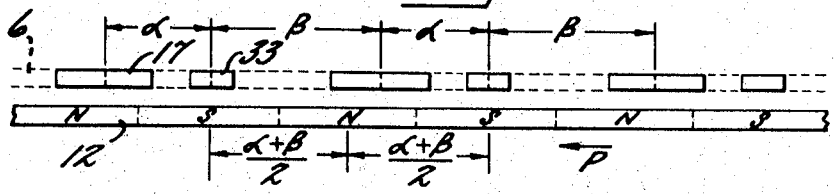
fig.4B.
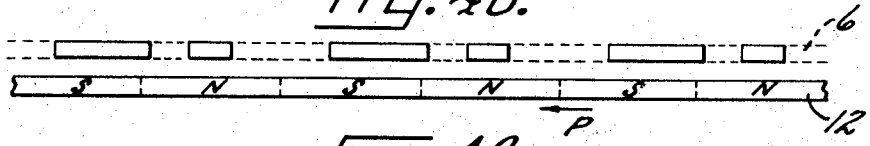
fig.4C.
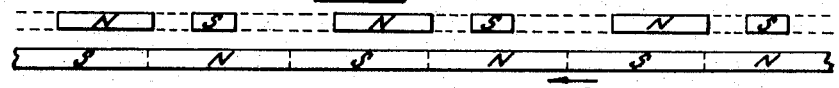
fig.4D.
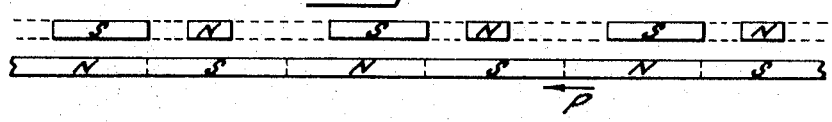
fig.4E.
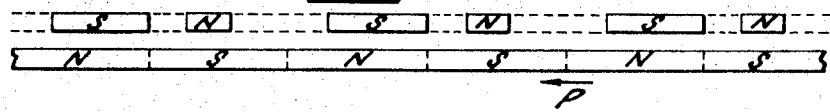
INVENTORS.
YASUO SUZUKI
YASUYOSHI KAMEYAMA
BY Wolfe, Hubbard, Leydig, Voit & Osann, Ltd.
ATTORNEYS.

SYNCHRONOUS MOTOR

This invention relates to a motor having a constant directional self-startability.

In certain of conventional small type synchronous motors, stator poles have been formed of two kinds of teeth including main pole teeth and shading pole teeth so that magnetic fluxes generated from both pole teeth would have a phase difference to self-start the rotor in a constant direction. However, the synchronous motor utilizing such shading effect has been low in the self-starting efficiency and complicated in the structure of the part made to have the shading effect so as to be thus costly. Particularly, the so-called hysteresis-type synchronous motor using a hysteresis magnetic material for the rotor has been lower in the efficiency. Further, while the synchronous motor using a permanent magnet for the rotor and adopting a mechanical reverse rotation preventing mechanism without utilizing the shading effect so as to give a constant directional self-startability could have been realized to be comparatively high in the efficiency, such motor has been not only still costly because of the mechanical reverse rotation preventing mechanism as adopted due to its inherent component parts, but also has been of reduced reliability and life due to the mechanical reverse rotation preventing mechanism, which could have been a source of generating noises.

The present invention has been suggested to eliminate the above-described defects of the conventional small motors by adopting such novel stator pole tooth arrangement as will be described in the following.

A main object of the present invention is, therefore, to provide a constant directional self-startable motor, without utilizing the shading effect nor requiring the mechanical reverse rotation preventing mechanism.

Another object of the present invention is to provide a motor which is remarkably thin in size. Other objects and advantages of the present invention will become clear as the disclosure proceeds in detail with reference to the accompanying drawings, in which:

FIG. 1 is a sectioned side view showing an embodiment of the present invention.

FIG. 2 is a plan view of a stator in the motor of FIG. 1.

FIG. 3 is a plan view showing a rotor as magnetized used in the motor of FIG. 1.

FIG. 4A to 4B are developed views of rotors and stators for showing the operation of the motor according to the present invention.

Figure 5:
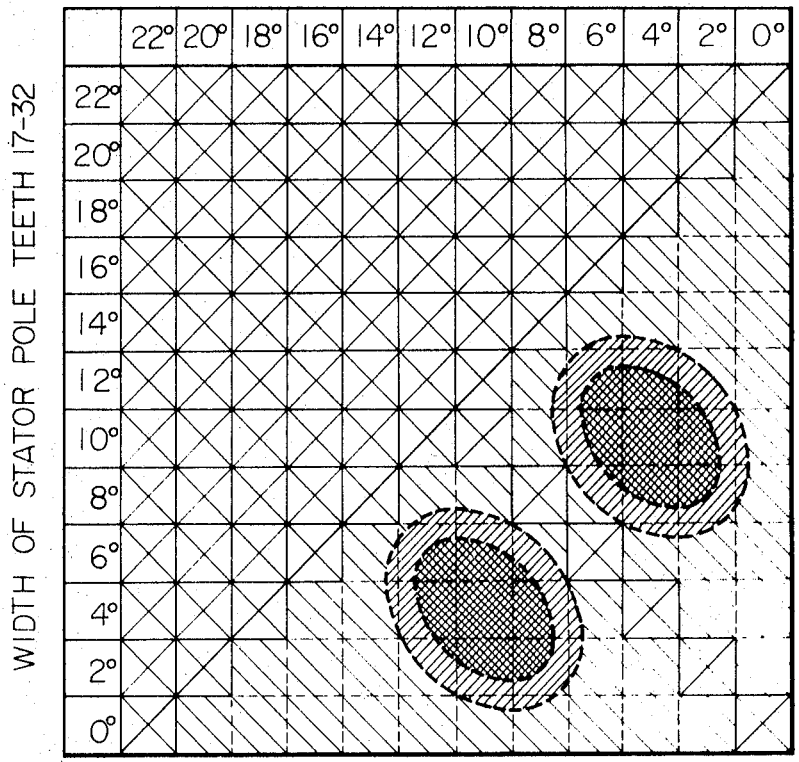

FIG. 5 is a measuring diagram of a relation between respective widths of two types of stator pole teeth and single directional startability of the rotor, in which regions surrounded by dotted line circles showing normal direction self-starting areas of the rotor. While the invention will be described with reference to the particular embodiment illustrated, the invention should not be limited to such embodiment but to cover all possible modifications, alterations and equivalent arrangement included in the scope of appended claims.

The synchronous motor of the present invention is contained in a housing formed of a combination of an upper case 1 and a lower case 2. The lower case 2 is made of a magnetic material and is a part of a magnetic circuit for exciting the stator discussed later. The lower case 2 is in the form of a bottomed cylinder and has a circular hole 3 made in its central part. In this circular hole 3, a cylindrical core 4 made of a magnetic material is fitted. On the peripheral drum of this core is loosely fitted a coil bobbin 5', on which an exciting coil 5 is wound. A stator 6, having a novel pole tooth arrangement which shall be disclosed later in detail, is formed in a disk shape having a circular hole 7 made in the center. The stator 6 is fixed to the upper end of the coil bobbin so as to be fitted at its outer periphery to upper end edge of the case 2 and at its inner peripheral edge of the hole 7 to a stepped part 4a made on the core 4. Thus, a closed magnetic circuit is formed by a core 4, lower case 2 and stator 6. A first bearing member 8 is pressed into inner peripheral part at lower end of the core 4. A second bearing member 9 is pressed into the inner peripheral part of a cylindrical part 1a provided at the central part of the upper case 1. A rotary shaft 10 made of a hard stainless steel is borne in the first and second bearing members 8 and 9, respectively at its lower and upper ends. The rotary shaft 10 is in contact at the lower end with a steel ball pressed into the first bearing 8. In the upper part of the rotary shaft 10, a rotor 12 as opposed with a proper clearance to the upper surface of the stator 6 is fixed through a holder 13. The above-mentioned rotor 12 is made of a hard magnetic material, is substantially in the form of a disk and has North and South poles radially magnetized thereon. This magnetized state shall be described in detail later. Sequential rotation of the rotary shaft 10 is transmitted to outernal equipment to be driven through a pinion 14 fixed to the upper end.

FIG. 2 shows a pole tooth arrangement of the stator 6 in the case of an in which the number of poles is 32 poles. As in the drawing, the stator 6 has an inner annular part 15 and an outer annular part 16 on concentric circles. Radially extending from the inner annular part 15 outward are 16 pole teeth 17, 18, 19, 20, 21, 22, 23, 24, 25, 26, 27, 28, 29, 30, 31 and 32, which are arranged at regular intervals and connected at the respective ends to the outer annular part 16, through very narrow bridges 17', 18', 19', 20', 21', 22', 23', 24', 25', 26', 27', 28', 29', 30', 31' and 32'. Radially extending from the other outer annular part 16 inward are 16 pole teeth 33, 34, 35, 36, 37, 38, 39, 40, 41, 42, 43, 44, 45, 46, 47 and 48, which are arranged at regular intervals so as to be respectively between each of the pole teeth 17–32, and connected at the respective ends to the inner annular part 15, through very narrow bridges 33', 34', 35', 36', 37', 38', 39', 40 ', 41', 42', 43', 44', 45', 46', 47', and 48'. The width of each of the second group of pole teeth 33 through 48 is made to be about one-half the width of each of the first group of pole teeth 17 through 32.

The pole teeth 17–32 extending from the inner annular part 15 as a base thereof and the pole teeth 33–48 extending from the outer annular part 16 as a base thereof are arranged according to the following rule.

That is, the center line of each of the pole teeth 33 –48 and the centerline of each of the pole teeth 17–32 respectively adjacent to said pole teeth 33–48 in the direction to rotate the rotor 12, which shall be assumed in the present instance to be the counterclockwise direction, are separated from each other by an angle $\alpha$ and, further, the centerline of each of the pole teeth 33–48 and the centerline of each of the pole teeth 17–32 respectively adjacent to said pole teeth 33 to 48 in the direction reverse to the direction to rotate the rotor 12 are separated from each other by an angle $\beta$ considerably larger then the above-mentioned angle $\alpha$.

In other words, the narrower pole teeth 33–48 are deviated in the direction to rotate the rotor 12 by $(\beta-\alpha)/2$ from the position in which total of 32 pieces of the broader and narrower pole teeth 17 through 48 are arranged alternately and at regular intervals.

FIG. 3 shows a magnetized state of the rotor 12 to be used in combination with the stator 6 as adopted in the case that the number of the poles shown in FIG. 2 is 32 poles. That is, on the lower surface of the rotor 12 opposed to the stator 6, 32 North and South poles in total are magnetized alternately and at regular intervals at an angle of $(\alpha+\beta)/2$.

Further, on the upper surface of rotor 12 opposed to lower surface of the upper case 1, a proper number of North and South poles are magnetized so that, in case the attraction of the stator 6 on the rotor 12 reaches an excess amount, such excessive attraction will be canceled with a magnetic attraction acting between these magnetic poles on the stator upper surface and the upper case 1 and, thus, any excessive force will be well prevented from being applied to the position where the steel ball 11 contact with the low end of the rotary shaft 10.

The operation of the self-starting synchronous motor of the present invention shall be explained with reference to FIG. 4, which shows developed views of the stator shown in FIG. 2 and developed views of the rotor shown in FIG. 3 in combination with each other. On the rotor 12, a total of 32 North and South poles are alternately magnetized at regular intervals at an angle of $(\alpha+\beta)/2$ and, on the stator 6, the narrower pole teeth 33 to 48 are deviated in any desired rotating direction by an angle of $(\beta-\alpha)2$ from the position of the case that a total of 32 stator pole teeth are alternately arranged at regular intervals.

First of all, in the state that no exciting current is flowing into the exciting coil 5, no magnetic flux is generated the stator pole teeth 17 –32 and 33 –48, the magnetic flux between the adjacent poles of the rotor 12 acts to pass through the magnetic circuit ( the stator pole teeth are made a part of the magnetic circuit) of the least magnetic resistance and, therefore, the rotor 12 remains stationary in a stable state in a fixed relative position to the stator 6.

In the stator pole tooth arrangement of the present invention, as described above, the pole teeth 33 –48 are narrower than the other group of pole teeth 17 –32 and are deviated in the rotating direction (leftward direction of an arrow P in FIGS. 4A through 4E.) Therefore, as shown in FIG. 4A or 4B, in the position in which the narrower stator pole teeth 33 –48 are opposed to the North or South poles of the rotor 12 substantially on the entire surface and the other stator pole teeth 17 –32 are opposed to the South or North poles of the rotor 12 on substantially half the surface, the rotor 12 remains stationary in a stable condition. This stable stationary position takes no other position of either one of the positions shown in FIGS. 4A and 4B. Even if the relative positions of the stator 6 and rotor 12 are varied by any cause, unless the exciting coil 5 is excited, the rotor 12 will move to and remains stationary in the above-mentioned stable stationary position of FIG. 4A or 4B.

Next, when the exciting coil 5 is excited by an alternating current voltage, the stator pole teeth 17 –32 and the other stator pole teeth 33 –48 are excited so as to be always respectively of polarities reverse to each other. Now, in case the stable stationary positions of the stator 6 and rotor 12 are in the state of FIG. 4A, if the stator pole teeth 17 –33 are excited to be of an North polarity and the other stator pole teeth 33 –48 are excited to be of an South polarity, the respective pole sections of S polarity of the rotor 12 will give substantially no rotating torque to the rotor 12 since these South pole sections are opposed substantially directly to the stator pole teeth 33 –48 which are also of South polarity, but the respective pole sections of North polarity of the rotor 12 will receive a magnetic repulsion since these North pole sections are positioned to the left of the stator pole teeth 17 –32 which are also of North polarity, and the entire rotor 12 will be, thus, moved leftward. That is, the rotor 12 is rotated in the counterclockwise direction.

As both of the force with which the respective North pole sections of the rotor 12 are attracted by the stator pole teeth 33 –48 which are made to be of an South polarity and the force with which the respective South pole sections are attracted rightward (in the direction reverse to the rotation) by the stator pole teeth 17 –32 which are made to be of North polarity will act in the directions reverse to each other to be balanced with each other, the rotation is stopped in this position. This state is shown in FIG. 4C. The operation up to this state takes place in the first half cycle of the alternating current source voltage.

At the time of the unexcited state produced when the first half cycle of the alternating current source voltage ends and the direction of the current flowing into the exciting coil 5 is reversed, the rotor 12 moves to another stable stationary position (FIG. 4B).

Thereafter, when the direction of the exciting current by the alternating current source is reversed, the stator pole teeth 17 –32 become to be of South polarity and the stator pole teeth 33 to 48 become to be of North polarity. Therefore, the respective pole sections of the rotor 12 made to be of south polarity and the rotor 12 is further rotated in the counterclockwise direction.

This rotating motion continues to the state of FIG. 4C, in which the force with which the respective North pole sections of the rotor 12 are attracted rightward ( in the direction reverse to the rotation) by the stator pole teeth 17 –32 made to be of South polarity and the force with which the respective South pole sections of the rotor 12 are attracted leftward (in the rotating direction) by the stator pole teeth 33 –48 made to be of North polarity are balanced in the directions reverse to each other, and the rotor 12 remains stationary in the state of FIG. 4C.

Thereafter, at the time of the unexcited state when the first one cycle of the alternating current source voltage ends and the direction of the current flowing into the exciting coil 5 is reversed again, there is substantially no magnetic flux from the stator pole teeth and, therefore, the rotor 12 moves to and stops in the above-described initial stable stationary position (FIG. 4A).

This is a state all returned to the same conditions as before one cycle of the alternating current source voltage. The rotor 12 repeats the same operation as is described above and continues the rotation in counterclockwise direction (leftward in FIG. 4).

Stating in other words, at each cycle of the alternating current source voltage impressed on the exciting coil 5, the rotor 12 rotates counterclockwise (in the normal rotating direction) by twice the pitch between the adjacent poles of different polarities of said rotor 12.

The above-described explanation can be applied in the same manner even if the direction of the exciting current of the first half cycle in which the alternating current source voltage is impressed is the direction as represented in FIG. 4B.

Next, in the stationary state of FIG. 4A, case the voltage of the first half cycle of the alternating current source voltage impressed is given in the direction in which the stator pole teeth 17 –32 are made to be of South polarity, substantially no rotating torque is given to the rotor 12 as the respective South pole parts of the rotor 12 are opposed substantially directly to the stator pole teeth 33–48 made to be of North polarity. On the other hand, since the respective North poles of the rotor 12 are deviated in the rotating direction from the stator pole teeth 17–32 made to be of South polarity, a rotating torque effective to rotate the rotor in the direction reverse to the rotation will be produced and the rotor will be rotated in the direction reverse to the rotation.

However, when such relative positions shown in FIG. 4D of the rotor 12 and stator 6 is reached, both of the force with which the respective North poles of the rotor 12 are attracted rightward (in the direction reverse to the rotation) by the stator pole teeth 17–32 made to be of South polarity and the force with which the respective South poles of the rotor 12 are attracted leftward (in the normal rotating direction) by the stator pole teeth 33–48 which are of North polarity are balanced in the directions reverse to each other and, thus, the further rotation of the rotor 12 is prevented from occuring. Thereafter, at the time of the unexcited state in which the first half cycle of the alternating current source voltage ends and the direction of the current flowing into the exciting coil 5 is reversed, there exists substantially no magnetic flux from the stator pole teeth, and the rotor 12 moves slightly in the rotating direction from the state of FIG. 4D and returns to the state of FIG. 4A. Thereafter, the direction of the current flowing into the exciting coil 5 is reversed, the stator pole teeth 17–32 are excited to be of North polarity and the stator pole teeth 33–48 are excited to be of South polarity. Therefore, the subsequent operations are the same as are in the first explanation of the operations. Thus, the rotor 12 continues to rotate in the counterclockwise direction at twice the pitch between the adjacent pole teeth of different polarities of said rotor 12 at each cycle of the alternating current source voltage.

The above-described explanation can be applied also to the case that, in the state of FIG. 4B, the voltage of the first half cycle of the alternating current source voltage impressed is given in the direction in which the stator pole teeth 17-32 are made to be of North polarity. In this case, the rotor 12 moves in the direction reverse to the rotation in the first half cycle, but begins a continuous rotation in the normal rotating direction after the next half cycle.

The common phenomenon seen in the above operation explanation will be as follows:

According to the particular arrangement of the present invention, in case, with the voltage of the first half cycle applied, the stator pole teeth 33–48 are made to be of the same polarity as the polarity of the respective poles of the rotor 12 opposing to said stator pole teeth 33–48, the rotor 12 begins to rotate in the normal rotating direction in the first half cycle but, on the other hand, in case, with the voltage of the first half cycle applied, the stator pole teeth 33 to 48 are made to be of a polarity reverse to the polarity of the respective poles of the rotor 12 opposing to said stator pole teeth 33–48, the rotor 12 rotates in the reverse direction only in the first half cycle of the source voltage but begins to rotate in the normal rotating direction after the next half cycle.

FIG. 5 shows results of actually measuring the relations between the pole widths of the stator pole teeth 17–32 and stator pole teeth 33–48 and the constant direction startability of the rotor 12.

This measurement has been effected with respect to the same motor of 32 poles as in the embodiment of the present.

In the drawing, the numerals in the ordinate represent the pole widths of the stator pole teeth 17–32 and the numerals in the abscissa represent the pole widths of the stator pole teeth 33–48. In view of the fact that it is self-evident that the total of the widths of both pole teeth must naturally be smaller than 360°/16 (that is 22.5°) and that, in case the widths of both pole teeth are equal, no constant directional startability is obtained, the portions represented by the mark ⊠ in FIG. 5 are not measured.

Referring to FIG. 5, in the regions as hatched with left upwardly extending lines, the function as of a motor, in fact, cannot be obtained and the rotor does not start. In the regions between two concentric dotted-line circles as hatched with right upwardly extending lines, the rotor self-starts but is unstable in the starting direction (rotates in the reverse direction in a possibility of 0 to 80 percent). In the regions inside the inner dotted line circles shown as meshed, the rotor positively self-starts in the normal rotating direction (rotates in the normal rotating direction in 100 percent.

Table 1 shows the results of actually measuring the relations between the deviation angles in the rotating direction of the stator pole teeth 38–48 and the startability of the rotor.

TABLE 1

| Deviation angle | Constant directional startability |
|---|---|
| 0° | The rotor self-starts but has no constant directional startability. |
| 1°–3° | It has a constant directional startability. |
| More than 4° | It is unstable in starting or, even if it starts, it does not continue synchronous rotation. |

As evident from FIG. 5 and table 1, it has been able to be confirmed that, when, among the stator pole tooth groups to be excited in polarities reverse to each other, the stator pole tooth group of one polarity is made to be of about one-half the pole width of the stator pole tooth group of the other polarity and is deviated by about 1° to 3° in any desired rotating direction, a positive and constant directional self-startibility is obtained.

What we claim is:

1. A self-starting, single-phase synchronous motor comprising: a motor housing; a stator mounted within said housing and attached thereto so as to form a magnetic circuit path together therewith, said stator comprising two numerically equal groups of alternately positioned pole teeth, wherein the respective individual teeth in one group are narrower in width than the respective individual teeth in the other group, and wherein the spacing between each of the wider pole teeth and the adjacent narrower pole teeth on either side thereof is less in the direction in which the motor rotates than it is in the direction opposite to the direction of rotation; an exciting coil coupled to said stator; and a rotor rotatably mounted within the housing in operative relation to said stator and having a surface thereof facing the stator and being divided into a plurality of segments of equal width with each alternate segment having an opposite magnetic polarity, said segments corresponding in total number to the total number of pole teeth on the stator.

2. A self-starting, single-phase synchronous motor as defined in claim 1, wherein said rotor and said stator are both essentially disk-shaped and concentrically positioned with respect to one another in spaced-apart, parallel planes.

3. A self-starting, single-phase synchronous motor as defined in claim 2 wherein the two pole teeth groups respectively extend radially inwardly and outwardly from concentric annular base members and are joined together by very narrow bridging segments connecting the free ends of the pole teeth in each group to the base member of the other group.

4. A self-starting, single-phase synchronous motor as defined in claim 2 wherein the surface of the rotor opposed to the surface facing the stator has at least one pair of magnetic poles positioned thereon, said pair comprising poles of opposite polarity.

5. A self-starting, single-phase synchronous motor as defined in claim 1 wherein the respective width of the individual pole teeth in one group is twice the respective width of the individual pole teeth in the other group.

6. A self-starting, single-phase synchronous motor as defined in claim 1 wherein the angular spacing between each of the wider pole teeth and the adjacent narrower pole teeth on either side thereof is from 1 to 3 angular degrees less in the direction in which the motor rotates than it is in the direction opposite to the direction of rotation.